Feb. 14, 1928.　　　　　　　　　　　　　　　1,659,347
J. M. BELL
TEMPERATURE INDICATOR FOR HEATING STOVES
Filed Feb. 21, 1920　　　　2 Sheets-Sheet 1
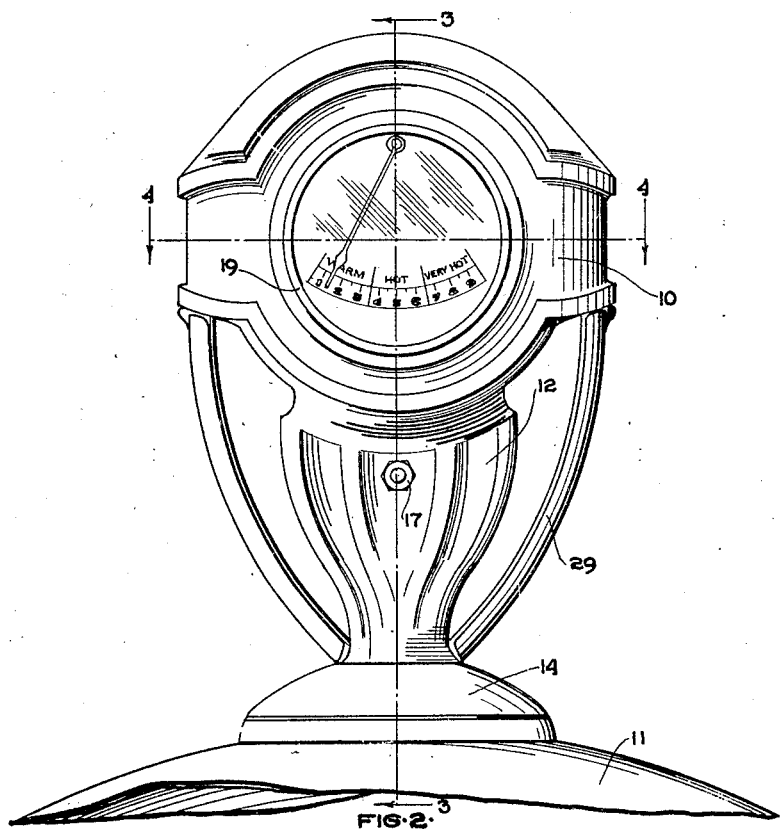
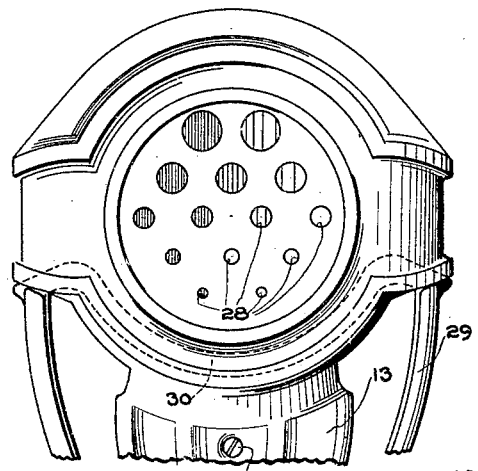
WITNESS:　　　　　　　　　　　　　　　INVENTOR
　　　　　　　　　　　　　　　　　　JAMES M. BELL
　　　　　　　　　　BY
　　　　　　　　　　　　　　　　　　ATTORNEYS Feb. 14, 1928.
J. M. BELL
1,659,347
TEMPERATURE INDICATOR FOR HEATING STOVES
Filed Feb. 21, 1920    2 Sheets-Sheet 2
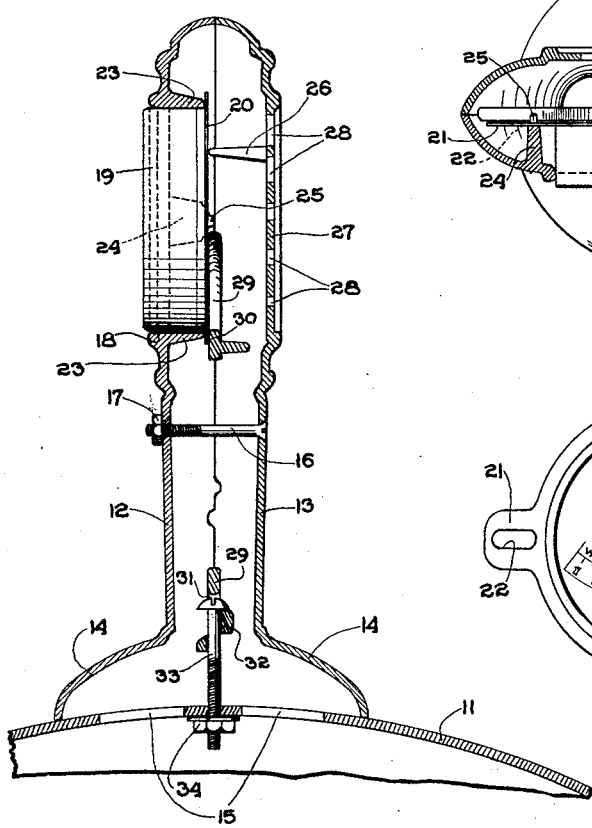
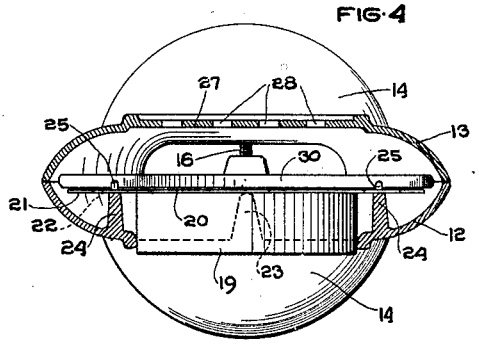
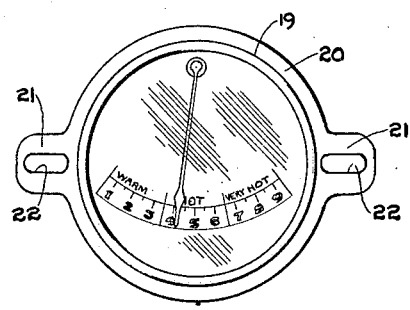
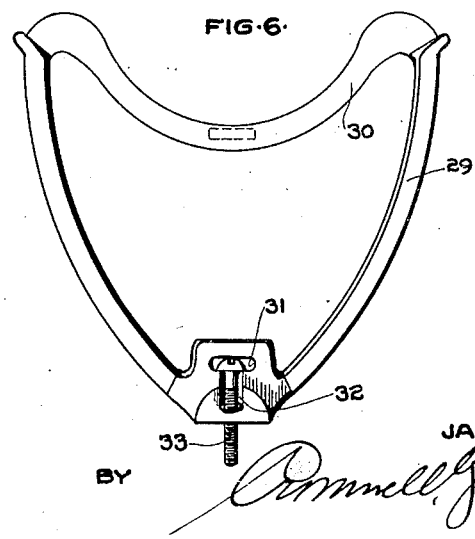
WITNESS:
INVENTOR
JAMES M. BELL
BY
ATTORNEYS Patented Feb. 14, 1928.

1,659,347

UNITED STATES PATENT OFFICE.

JAMES M. BELL, OF CHICAGO, ILLINOIS, ASSIGNOR TO MONTGOMERY WARD & CO. INC., OF CHICAGO, ILLINOIS, A CORPORATION OF ILLINOIS.

TEMPERATURE INDICATOR FOR HEATING STOVES.

Application filed February 21, 1920. Serial No. 360,525.

The present invention relates to heating stoves generally, and contemplates the provision in connection with a stove of novel means for indicating the temperature of the heat thereof.

The primary object of the invention is to afford an indicator by which to regulate and control the heat of a room from the temperature indicated at the stove rather than from the temperature conditions prevailing at a point in the room remote from the stove. Such conditions usually are indicated by a thermometer hung upon a wall. By the use of the invention the actual temperature of the heat given off by the stove is determined at the latter, and before the heat has opportunity to cool. With knowledge of that fact, and the further fact that a predetermined heat at the stove will produce predetermined degrees of heat at relative distances therefrom, the temperature indicated at the stove will serve as a guide of greater reliability for the regulation of the general temperature conditions of the room.

A further object of the invention is to provide an indicator of the class described which is so constructed and designed as to utilize for its support an element of the stove structure that ordinarily serves only for ornamental purposes. The utilization of this element positions the indicator at a point where it is susceptible to the highest degree of heat radiated by the stove, and thereby indicates the true temperature to be utilized as a basis for regulation of the heat of the room.

A further object of the invention is the provision of a temperature indicator for stoves the parts of which are so related and assembled that the indicator will be subjected to an even distribution of the heat rising to the highest point of the stove, and thereby insuring a true indication of the actual temperatures given off by the stove.

Other objects and advantages of the invention will appear as the nature of the improvements is better understood, the invention consisting substantially in the novel construction, combination and arrangement of parts hereinafter fully described, illustrated in the accompanying drawings, and finally pointed out in the appended claims.

The form herein illustrated and described is presented as a practical embodiment of the invention, but this is for illustrative purposes and is, therefore, not to be taken in a restrictive sense.

In the drawings—

Fig. 1 is a front elevation of a temperature indicator constructed in accordance with the present invention.

Fig. 2 is a rear elevation thereof, parts being broken away.

Fig. 3 is a vertical transverse sectional view of the same, as on the line 3—3, Fig. 1.

Fig. 4 is a sectional plan view, as on the line 4—4, Fig. 1.

Fig. 5 is a front elevation of the metal thermometer employed for the visual indication of the temperatures.

Fig. 6 is an elevation of the attaching yoke by which the indicator is sustained in applied position on the stove.

As before stated, the invention contemplates utilizing an element of the stove structure that ordinarily serves only for ornamental purposes, which element provides the requisite support for positioning the indicator on the stove. This is indicated by the numeral 10, and is the ornament that surmounts the dome 11 of the stove. As illustrated in the accompanying drawings, the element 10 simulates an urn, but it is obvious that the configuration of this element may follow any other outline. The element 10, therefore, is the support whereby the indicator is positioned at the highest point of the stove, to wit, the crest of the dome 11. This support comprises a front member 12 and a rear member 13, generally complements of each other, and each of these members 12 and 13 is provided with an enlarged base 14, which, in the united relation of the members 12 and 13, provide a throat for directing the heat to the interior of the members 12 and 13. For this purpose the bases 14 are open at their lower ends and extend over a series of openings 15 formed in the dome 11. The edges of the members 12 and 13 abut, and said members are held in assembled position upon each other by a fastening bolt 16, the head of which is countersunk in the rear member 13, while its screw threaded end passes through an opening in the front member 12 where it is secured by a nut 17.

It will be observed from Figs. 1 and 2 that the upper ends of the members 12 and 13 are enlarged laterally so as to provide a relatively large head to the support 10, the edges of the upper portions of said members resting against each other, and thereby closing the upper end of the support 10 so as to prevent exit of the rising column of heat from the interior of the support except in the manner hereinafter specified. The enlarged head of the member 12 has an annular opening 18 formed therein, and within said opening is positioned a metallic thermometer 19 of any approved construction. This thermometer is clearly illustrated in Figs. 3, 4 and 5, and the rear wall of its casing has formed thereon a marginal flange 20 which is provided at opposite points with outwardly extending ears 21, each of which is provided with an elongated slot 22. The casing of the thermometer 19 is introduced to the opening 18 from the inner side of the front member 12, and the flange 20 seats against a pair of inwardly projecting studs 23 arranged at the upper and lower inner sides of said opening 18. The inner face of said member 12 also carries a pair of oppositely disposed lugs 24, each of which is provided with a centering projection 25, said projections 25 being received by the slots 22 of the ears 21. By thus positioning the metallic thermometer 19 the same is held in fixed position within the opening 18, and to prevent inward displacement of said thermometer from the opening a bearing stud 26 is carried by the inner face of the rear member 13, which stud contacts with the rear wall of the casing of the thermometer, as clearly seen in Fig. 3.

The enlarged head of the rear member 13, at a point which is substantially opposite to the opening 18 of the front member 12, is provided with a web 27 wherein is formed a plurality of heat discharging openings 28. As clearly shown in Figs. 2 and 3, these openings vary in diameter, the smallest openings being located adjacent to the lower edge of the web 27 and gradually increasing in size to the upper edge thereof, at which point the largest openings are formed. The purpose of thus varying the size of the discharge openings 28 is to retain the heat within the interior of the support 10 until it has been evenly distributed over the rear wall of the thermomter 19 so that the latter will properly respond in indicating the temperature of the heat. The openings of smaller diameter, therefore, will not permit passage of the heat except in small quantities, and the heat must pass upwardly to the top of the support 10 where the closed upper end forms a pocket, and thereby traps the heat, causing it to spread out evenly over the rear plate of the thermometer casing, delivering an even heat to all points thereof, and finally passing out of the enlarged openings at the upper portion of the web 27. It will thus be seen that the rising column of heat passing through the openings 15 of the dome 11 and into the interior of the support 10 will cause operation of the thermometer to indicate its temperature, and this temperature will, of course, vary as the degree of heat radiated by the stove varies. The hand of the thermometer co-operating with a graduated dial, as is usually found in metallic thermometers, will visually indicate these varying temperatures, and the fire of the stove may thus be controlled so as to regulate the temperature of the room in which the stove is placed.

For attaching the support 10 in fixed relation to the dome 11 a yoke 29 is employed. This yoke comprises a pair of upwardly diverging arms connected at their upper ends by a cross-bar 30, which cross-bar is depressed at its central portion to impart thereto a curvature corresponding substantially to the curvature of the lower portion of the flange 20 of the thermometer 19. The crossbar 30 occupies a position at the interior of the support 10, its ends being received by notches formed in the abutting edges of the members 12 and 13. The sides or diverging arms of the yoke 29 are thereby positioned at the exterior of the support 10, as illustrated in Figs. 1 and 2. At the lower end of the yoke 29 is formed an opening 31, which is provided with a downwardly extending throat 32, one side of said throat being cut away in order to receive an anchoring bolt 33 by which the support 10 is attached to the dome 11. By cutting away one side of the throat 32 the anchoring bolt 33 may be canted at an angle for removal from and introduction to said throat, the head of said screw being received by the opening 31 while its lower threaded end passes through an opening in the dome 11 where it is fastened in position by a nut 34. Thus it will be seen that the bolt 33 constitutes the sole means for holding the support 10 in position on the dome 11, and when engaged with the latter said support is fixedly mounted thereon and held in position so that the heat passing through the openings 15 will enter the base of the support, formed by the enlarged ends 14, and be directed by the latter into the space between the said members. This space constitutes a duct for directing the heat upwardly to the thermometer 19, and the heat being held in the upper end of the support in the manner previously indicated, the same is evenly distributed over the thermometer to insure the latter indicating the true temperature of the heat. Eventually the heat finds its way to the surrounding atmosphere through the openings 28.

By the provision of the temperature indicator above described the temperature of a room may be regulated in accordance with the exact temperature of the heat radiated from the stove and directly indicated as the heat rises from the latter and before it has an opportunity to become cooled. With knowledge of the temperature at the stove, and the further fact that a predetermined heat at the stove will produce predetermined degrees of heat at relative distances therefrom, the temperature indicated at the stove will serve as a guide of greater reliability for the regulation of the heat of the room than if the latter temperature is determined at points remote from the room and the heat of the stove regulated by the temperature at such remote point or points.

While the thermometer 19 has been referred to as of the metallic type, the invention is not limited to such, the substitution of a mercury or other form of thermometer being contemplated if such be desired.

I claim:

1. In a temperature indicator of the class described, the combination with a stove casing part having an opening, of a tubular support mounted on said part and communicating with said opening for receiving the heated fluid as it passes through said opening, said support being closed at its upper end, and an indicator arranged at one side of said support to be contacted by the heated fluid passing through the support, whereby to indicate the temperature of the heat, said support being provided at a point opposite to the indicator with heat discharging openings designed to evenly distribute the heated fluid over said indicator before its passage from the support.

2. In a temperature indicator of the class described, the combination with a stove casing part having an opening, of a tubular support mounted thereon, the lower end of said support being open and in communication with said opening and its upper end closed, whereby to receive and trap the heated fluid rising in said support, and an indicator arranged in one side of said support adjacent to the upper end thereof to be subjected to the heat of the fluid trapped in the support, the opposite side of said support adjacent to the upper end thereof having a plurality of openings gradually increasing in diameter from the lower to the upper of said openings, whereby to permit gradual passage of the heated fluid to the exterior of the support after contacting of the fluid with the indicator.

3. In a temperature indicator of the class described, the combination with the dome of a stove having an opening therein for passage of heated fluid, of a tubular support mounted on said dome and closed at its top to trap the heated fluid therein, said support comprising a pair of complemental members, fastening means for holding said members in separable relation, an indicator arranged in one of said members adjacent to the upper end of the support to be subjected to the heated fluid trapped in the latter, and means carried by the other member and located therein opposite to said indicator for permitting gradual passage of the heated fluid to the exterior of the support after contact of the heated fluid with the indicator.

4. In a temperature indicator of the class described, the combination with the dome of a stove having an opening for passage of heated fluid, of a tubular support mounted thereon and closed at its top to trap the heated fluid therein, said support including a pair of complemental members, means for fastening said members in separable relation, an indicator arranged in one of said members adjacent to the top of said support and subjected to the rising column of heated fluid entering said support, the other member being provided at its upper end and in opposite relation to said indicator with a plurality of openings increasing gradually in diameter from the lower to the upper of said openings for permitting gradual passage of the heated fluid to the exterior of the support after contact of the heated fluid with the indicator, and means for fastening the support to said dome.

5. In a temperature indicator of the class described, the combination with a stove casing part of a tubular support mounted thereon and closed at its top to trap the heated fluid therein, said support including a pair of complemental members, means for fastening said members in separable relation, an indicator mounted in one of said members adjacent to its top to be subjected to the rising column of heated fluid, means associated with the other member for permitting gradual passage of the heated fluid to the exterior of the support after contact of the heated fluid with the indicator, a fastening device embraced by the members of said support for holding the latter to the stove, and means for detachably connecting said fastening device with the stove.

6. In a temperature indicator of the class described, the combination with a stove casing having an opening therein, of a tubular support mounted thereon, said support being closed at its upper end and open and in communication with said opening at its lower end, and an indicator carried by the support and having an outspread heat-receiving surface arranged vertically at one side of said support to be influenced by the heated fluid passing through the support, said support being provided in a vertical wall in spaced parallel relation to the indicator with a plurality of heat-discharging openings distributed over an area of the wall substantially co-extensive with the heat-receiving surface of the indicator, whereby to cause the heated fluid within the support to be distributed evenly over the heat-receiving surface of the indicator before leaving the support.

7. In a temperature indicator of the class described, the combination with a stove casing part of a tubular support mounted thereon, the lower end of said support being open and its upper end closed, whereby to receive and trap fluid heated by the stove and rising in said support, and an indicator arranged in one side of said support with the heat-receiving surface of the indicator extending vertically in opposed relation to a portion of the wall of the support, said portion of the wall being apertured throughout the vertical extent of the heat-receiving surface of the indicator by openings so shaped and arranged as to cause the heated currents flowing upwardly through the support to continue in contact with such surface uniformly throughout the vertical extent of the same.

In testimony whereof I have hereunto subscribed my name.

JAMES M. BELL.